(12) United States Patent
Anderson et al.

(10) Patent No.: US 11,460,636 B2
(45) Date of Patent: Oct. 4, 2022

(54) FLEXIBLE RIBBON FIBER SEPARATION TOOL

(71) Applicant: Prysmian S.p.A., Milan (IT)

(72) Inventors: Clint Nicholaus Anderson, West Columbia, SC (US); Ehsan Fallahmohammadi, Columbia, SC (US)

(73) Assignee: Prysmian S.p.A., Milan (IT)

( * ) Notice: Subject to any disclaimer, the term of this patent is extended or adjusted under 35 U.S.C. 154(b) by 103 days.

(21) Appl. No.: 16/810,278

(22) Filed: Mar. 5, 2020

(65) Prior Publication Data

US 2021/0278593 A1 Sep. 9, 2021

(51) Int. Cl.
| | |
|---|---|
| *B26B 3/00* | (2006.01) |
| *G02B 6/25* | (2006.01) |
| *B26B 5/00* | (2006.01) |

(52) U.S. Cl.
CPC .................. *G02B 6/25* (2013.01); *B26B 3/00* (2013.01); *B26B 5/00* (2013.01)

(58) Field of Classification Search
CPC .... G02B 6/25; B26B 3/00; B26B 5/00; H01B 13/00; H02G 1/1295
See application file for complete search history.

(56) References Cited

U.S. PATENT DOCUMENTS

| | | | | |
|---|---|---|---|---|
| 3,355,803 A | * | 12/1967 | Hanlon | H02G 1/1295 30/91.1 |
| 3,839,788 A | * | 10/1974 | Addis | B26B 29/02 30/287 |
| 5,142,780 A | * | 9/1992 | Brewer | H02G 1/1229 30/294 |
| 9,819,161 B2 | | 11/2017 | Scirbona et al. | |
| 2005/0066466 A1 | * | 3/2005 | Butterfield | A47L 13/08 15/236.01 |

(Continued)

FOREIGN PATENT DOCUMENTS

| | | |
|---|---|---|
| CN | 201392417 Y | 1/2010 |
| JP | H11198089 A | 7/1999 |
| JP | 2015099316 A | 5/2015 |

OTHER PUBLICATIONS

Extended European Search Report dated Jul. 6, 2021, EP Application No. 21155500.8, 9 pages.

(Continued)

*Primary Examiner* — Evan H MacFarlane
*Assistant Examiner* — Liang Dong
(74) *Attorney, Agent, or Firm* — Slater Matsil, LLP

(57) ABSTRACT

A fiber separation tool is provided. The fiber separation tool includes a fin configured to maintain the fiber separation tool in a parallel orientation with respect to a plurality of fibers, a hook tip at a first end of the fin, wherein the hook tip is configured to separate the plurality of fibers, a blade disposed in the fin above the hook tip, wherein a portion of a cutting edge of the blade protrudes from a blade opening in the fin, and wherein the blade is configured to slice through a bonding material connecting the plurality of fibers, a lip at each side of the blade opening, wherein the lip is configured to prevent individual fibers of the plurality of fibers from contacting the blade, and a pivot point configured to guide the fiber separation tool between the individual fibers.

20 Claims, 7 Drawing Sheets

(56) References Cited

U.S. PATENT DOCUMENTS

| | | | |
|---|---|---|---|
| 2007/0263964 A1 | 11/2007 | Cody et al. | |
| 2010/0319199 A1 | 12/2010 | Mullaney et al. | |
| 2013/0220097 A1 | 8/2013 | Raker | |
| 2014/0016905 A1* | 1/2014 | Tanabe | G02B 6/4405 385/114 |
| 2014/0233899 A1* | 8/2014 | Miyamoto | G02B 6/441 385/109 |
| 2015/0049997 A1* | 2/2015 | Isaji | G02B 6/4403 385/114 |

OTHER PUBLICATIONS

Hotlight, Hotlight Fiber Optic Co., Ltd., "Optical Kms-K Fiber Cable Sheath Cutter Copper," https://holightoptic.en.made-in-china.com/product/WsIEIHXKEbkr/China-Optical-Kms-K-Fiber-Cable-Sheath-Cutter-Copper.html, Nov. 27, 2019, 9 pages.

Jonard Tools, FOD-2000, "Fiber Optic Drop Cable Slitter," https://www.jonard.com/Products/Fiber-Optic-Tools-Fiber-Optic-Stripping-and-Slitting-JIC-4366-Cable-Stripper-And-Ring-Tool#, Nov. 27, 2019, 3 pages.

Jonard Tools, JIC-4366—"Cable Strip Tool, Copper & Optical Fiber Cables," https://www.mouser.in/new/jonard-industries/jonard-fod-2000-cable-slitters/, Nov. 27, 2019, 2 pages.

* cited by examiner

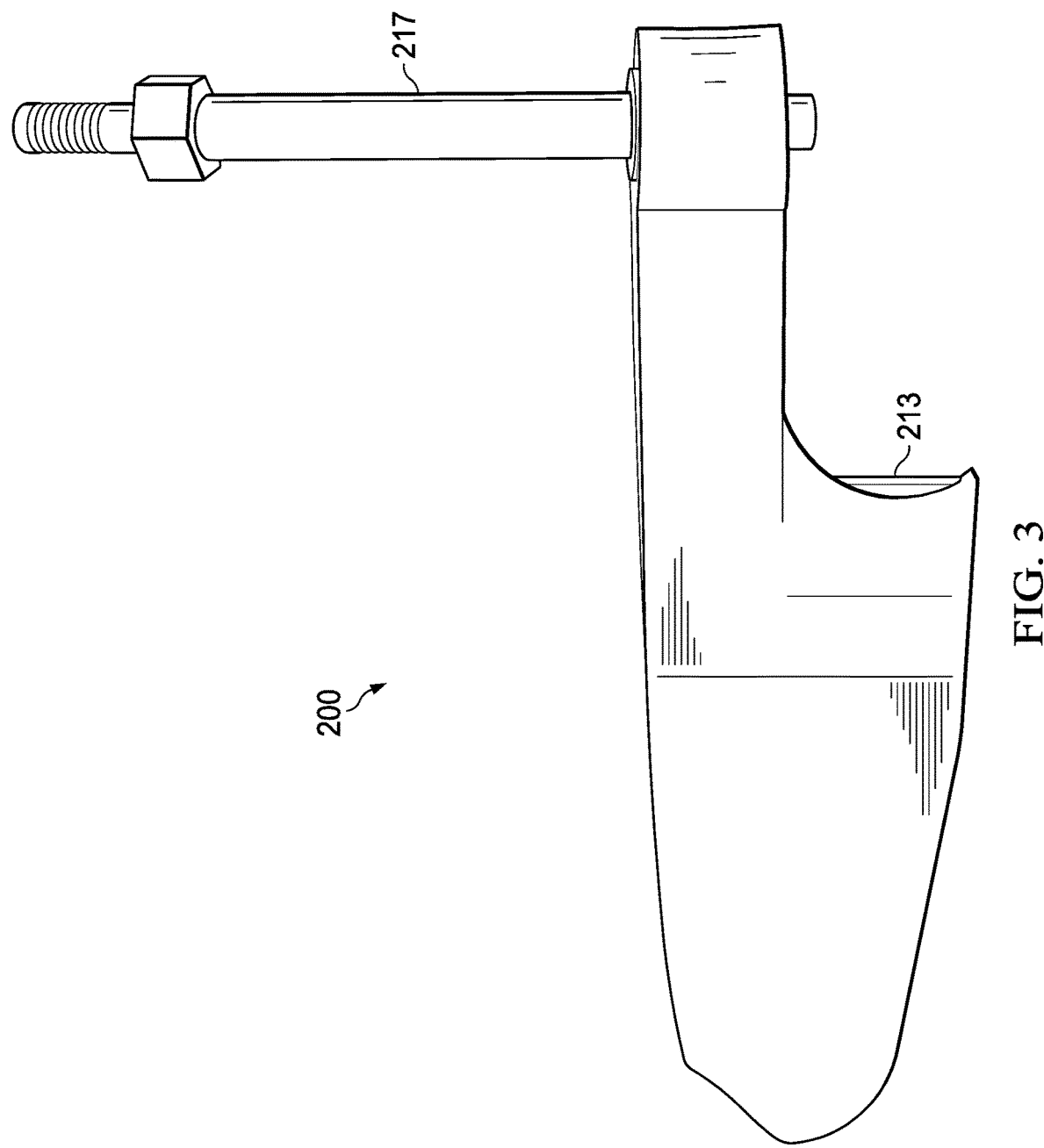

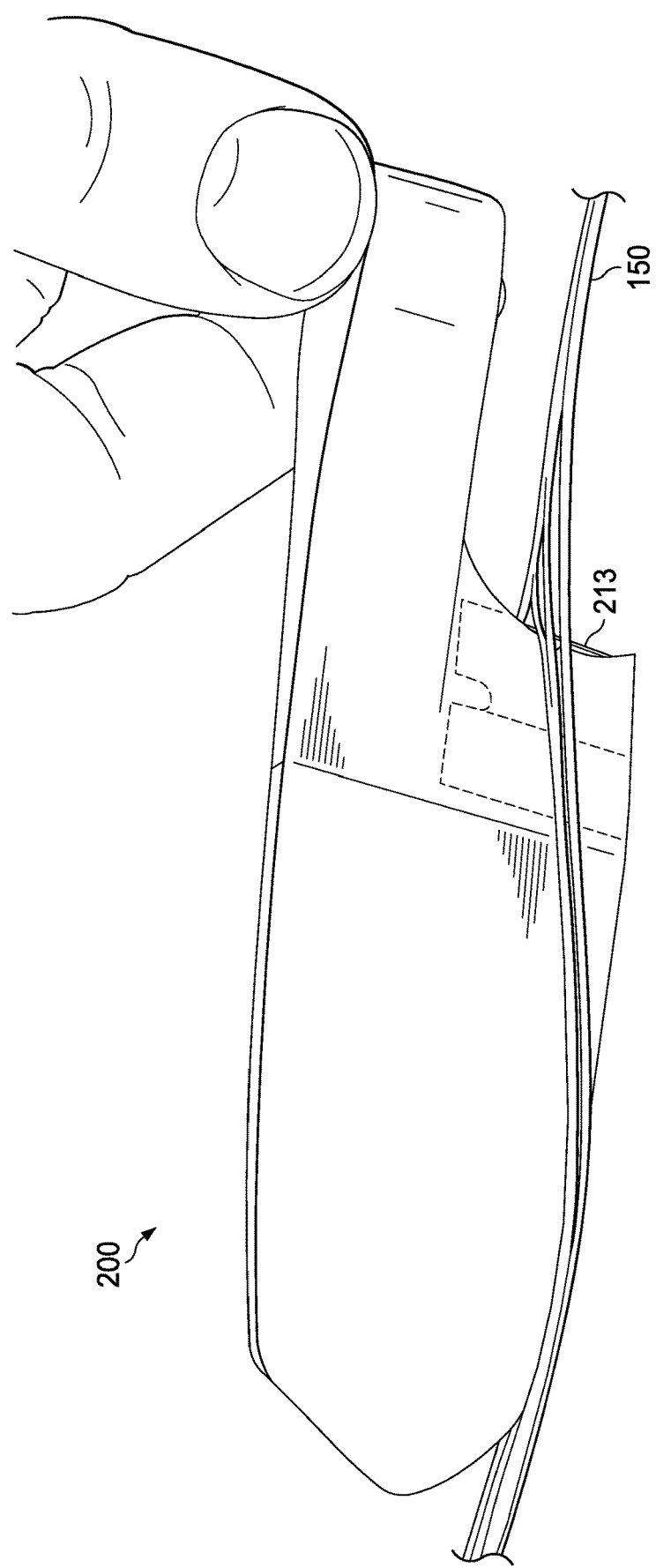

FLEXIBLE RIBBON FIBER SEPARATION TOOL

TECHNICAL FIELD

The present invention relates generally to a method of separating optical fibers and an optical fiber separation tool, and, in particular embodiments, to a method of separating optical fibers using a fiber separation tool.

BACKGROUND

Optical fibers are very small diameter glass strands capable of transmitting an optical signal. Optical cables typically include many optical ribbons bundled together as a single cable. Each optical ribbon may include several optical fibers.

Optical fibers provide advantages over conventional communication lines. Optical-fiber communication networks can transmit significantly more information at significantly higher speeds than is possible with traditional wire-based networks. Optical cables are therefore widely used in long distance communication and have replaced other technologies such as satellite communication, standard wire communication, etc. Besides long distance communication, optical fibers are also used in many applications such as medicine, aviation, computer data servers, etc.

With the continued growth of optical cables across multiple applications, and the increased demand for faster transmission of larger amounts of information, the thickness of the optical cables is increasing due to an increase in the number of optical fibers included in each cable. The large number of optical fibers makes the process of separating the optical fibers tedious and time-consuming. The traditional process also results in damage to the optical fibers, for example, by a service technician cutting through the thin optical fibers or damaging the coating or ink layers of the optical fibers.

SUMMARY

In accordance with an embodiment of the present invention, a fiber separation tool includes a fin configured to maintain the fiber separation tool in a parallel orientation with respect to a plurality of fibers, and a hook tip at a first end of the fin, wherein the hook tip is configured to separate the plurality of fibers. A blade is disposed in the fin above the hook tip, a portion of a cutting edge of the blade protrudes from a blade opening in the fin, and the blade is configured to slice through a bonding material connecting the plurality of fibers. The fiber separation tool further includes a lip at each side of the blade opening, wherein the lip is configured to prevent individual fibers of the plurality of fibers from contacting the blade, and a pivot point configured to guide the fiber separation tool between the individual fibers.

In accordance with an embodiment of the present invention, a method of using a fiber separation tool includes arranging an array of fibers side-by-side, wherein each fiber is connected to at least one other neighboring fiber with a bonding material, and wherein the bonding material is intermittently dispersed between each fiber. The method further includes selecting two neighboring fibers from the array of fibers, inserting a hook point of the fiber separation tool between the selected fibers at a region free of the bonding material, guiding the fiber separation tool in a direction parallel to a length of the selected fibers, contacting the bonding material connecting the selected fibers with a blade of the fiber separation tool, and directing the fibers to each side of the fiber separation tool.

In accordance with an embodiment of the present invention, a fiber separation tool includes a head portion including a fin having a first vertical surface, a hook tip at a bottom edge of the first vertical surface, a blade opening in the first vertical surface above the hook tip, and a lip on each side of the blade opening on the first vertical surface. The fiber separation tool further includes a handle portion including a pivot point and a bearing hole.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a fiber separation tool with a handle according to embodiments of the present invention; and FIG. 4 illustrates a fiber separation tool separating neighboring optical fibers of a flexible ribbon according to embodiments of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Optical fibers are very small diameter glass strands capable of transmitting an optical signal. Optical cables typically include many optical ribbons bundled together as a single cable. Each optical ribbon may include any number of optical fibers.

Typically, the optical cable is shipped intact to the field for installation. Once there, a service technician is required to splice the cable and separate the optical ribbon into individual optical fibers. These optical fibers may, for example, then be inserted into a suitable interconnection. However, because each optical cable has a large number of optical fibers, and the number of optical fibers is likely to continue increasing, this process can be both tedious and time-consuming.

It is also possible for the service technician to accidentally cut through the thin optical fibers while separating them. Also, when separating one or more optical fibers from an optical ribbon, the coating or ink layers of the optical fibers may get damaged. For example, optical fibers in flexible ribbons may be joined by a bonding material having a bonding property that exceeds the cohesive strength of the fiber coating. As a result, pulling the optical fibers apart or separating them using traditional tools may cause a break in the fiber coating instead of in the bonding material as intended.

Accordingly, there is a need for an improved tool that can separate the optical fibers without damaging the optical fibers and without need for specialized training to allow service technicians of varying levels of experience to easily and efficiently separate the optical fibers without damaging the optical fibers.

Various embodiments of the present invention disclose a fiber separation tool that can be used to safely separate optical fibers of an optical ribbon and methods of using the same.

Figure 1A:
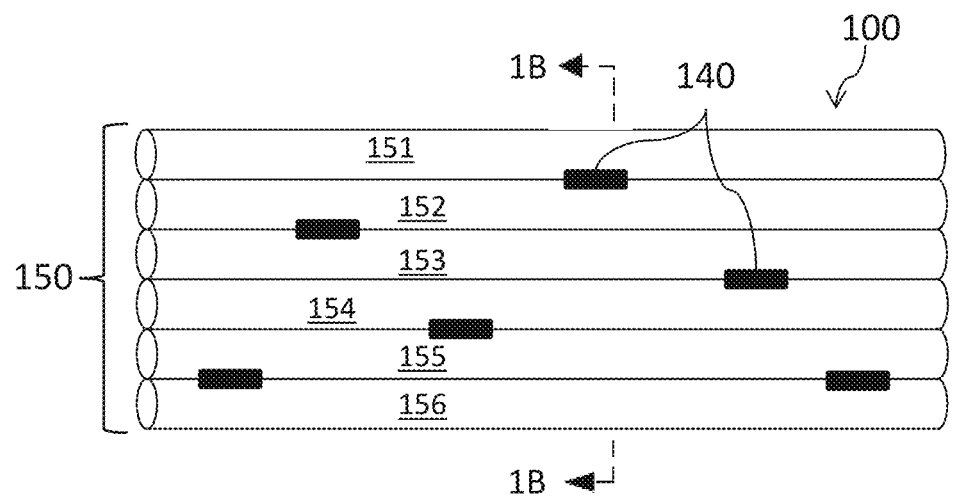
FIG. 1A illustrates a projection view of an array of optical fibers forming a flexible ribbon.
Figure 1B:
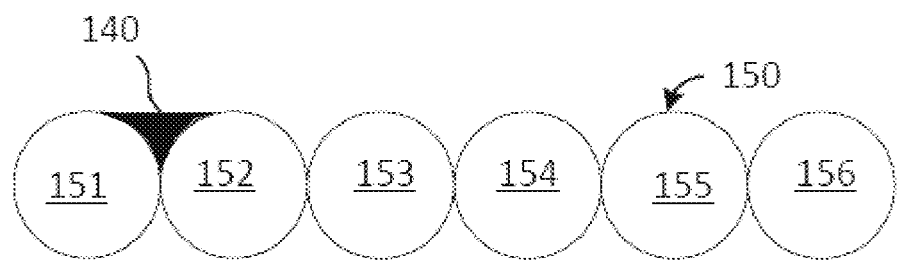
FIG. 1B illustrates a corresponding cross-sectional area of the array of optical fibers illustrated in FIG. 1A.

FIG. 1A illustrates a projection view of an array of optical fibers forming a flexible ribbon, and FIG. 1B illustrates a corresponding cross-sectional area of the array of optical fibers illustrated in FIG. 1A.

FIG. 1A illustrates a flexible ribbon 100, such as a flexible ribbon cable. The flexible ribbon 100 includes a plurality of optical fibers 150, such as a first, a second, a third, a fourth, a fifth, and a sixth optical fiber 151-156. Though six optical fibers 150 are illustrated in FIG. 1A, more or fewer optical fibers may be included in the flexible ribbon 100. The optical fibers 150 each have a coating or ink layer.

The optical fibers 151-156 are arranged parallel to one another and are connected to neighboring optical fibers 151-156 using a bonding material 140. The bonding material 140 may be a substantially cured ribbon-matrix material having elongation-to-break and modulus characteristics that promote reversible folding and/or rolling of the flexible ribbon 100. The bonding material 140 may include ultraviolet (UV) acrylate. In other embodiments, the bonding material 140 may include low-modulus elastomers and silicones, such as UV-curable silicones and RTV silicones (i.e., room-temperature-vulcanization silicone). The UV-cured silicones have some advantages over RTV silicones, including faster curing and reduced shrinkage. In addition, unlike UV-cured silicones, RTV silicones require exposure to humidity and high temperatures for extended time periods and can generate unwanted byproducts (e.g., acetic acid) during curing. Suitable UV-curable silicones include LOCTITE® SI 5240™ UV-cured silicone and Addisil UV-cured silicones (e.g., UV 50 EX, UV 60 EX, and UV 70 EX). The bonding material 140 is not limited to these materials; other materials for bonding optical fibers as known to persons of ordinary skill in the art may also be used.

The bonding material 140 is arranged across the flexible ribbon 100 so as to selectively leave a large surface of the optical fibers 150 free of the bonding material 140. For example, in the cross-sectional view of FIG. 1B, the bonding material 140 is formed between the first optical fiber 151 and the second optical fiber 152, and no bonding material is formed between the other optical fibers 152-156 at this cross-section. Consequently, optical fibers 150 maintain a large degree of freedom and can be effectively folded or otherwise randomly positioned when the flexible ribbon 100 is subjected to external stress, for example. In various embodiments, the optical fibers 150 can be folded into a densely packed configuration. In one or more embodiments, the folded optical fibers 150 may have a non-circular or irregular shape.

Figure 1C:
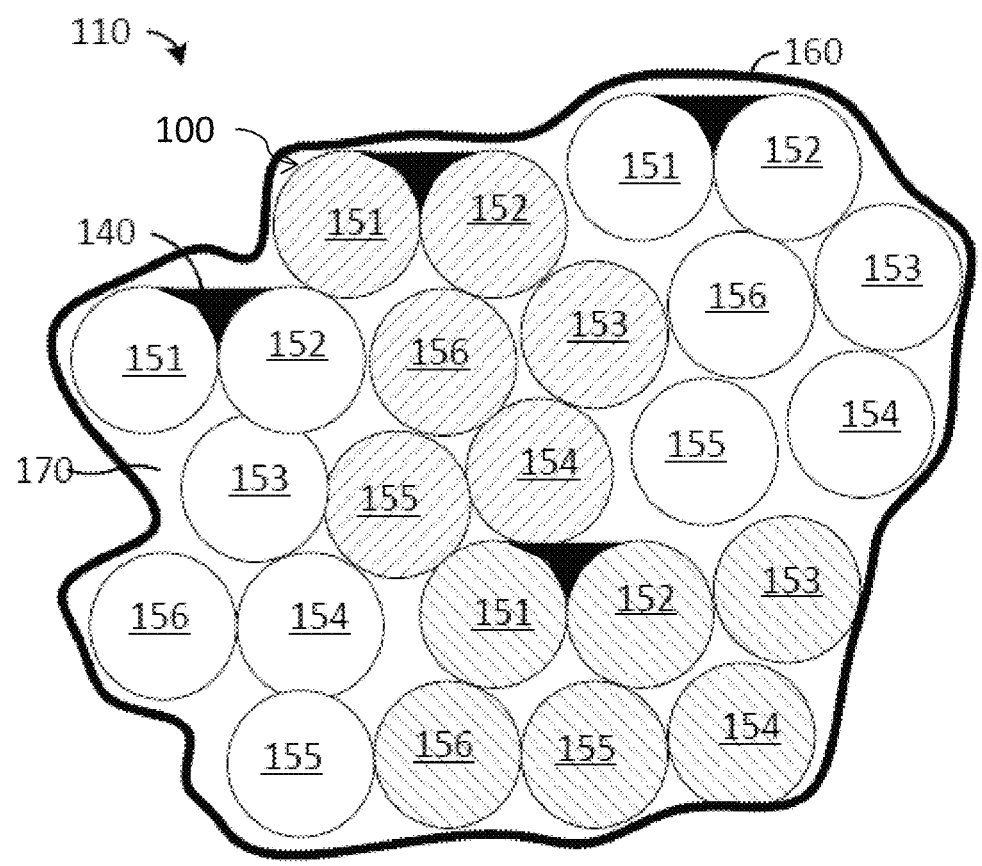
FIG. 1C illustrates a buffer tube encasing multiple flexible ribbons according to FIG. 1A.

FIG. 1C illustrates a buffer tube encasing multiple flexible ribbons in accordance with an embodiment of the present invention. A buffer tube no encases multiple flexible ribbons 100. The flexible ribbons 100 are enclosed by a buffer tube jacket 160. In one or more embodiments, the buffer tube jacket 160 comprises polypropylene. In other embodiments, the buffer tube jacket 160 comprises cellular polypropylene, polyethylene, nylon, or other materials. In addition, the flexible ribbons 100 may be dispersed within a gel 170 that allows the flexible ribbons 100 to move around relative to each other. Of course, an optical cable (not shown) may comprise a plurality of buffer tubes 110.

Figure 1D:
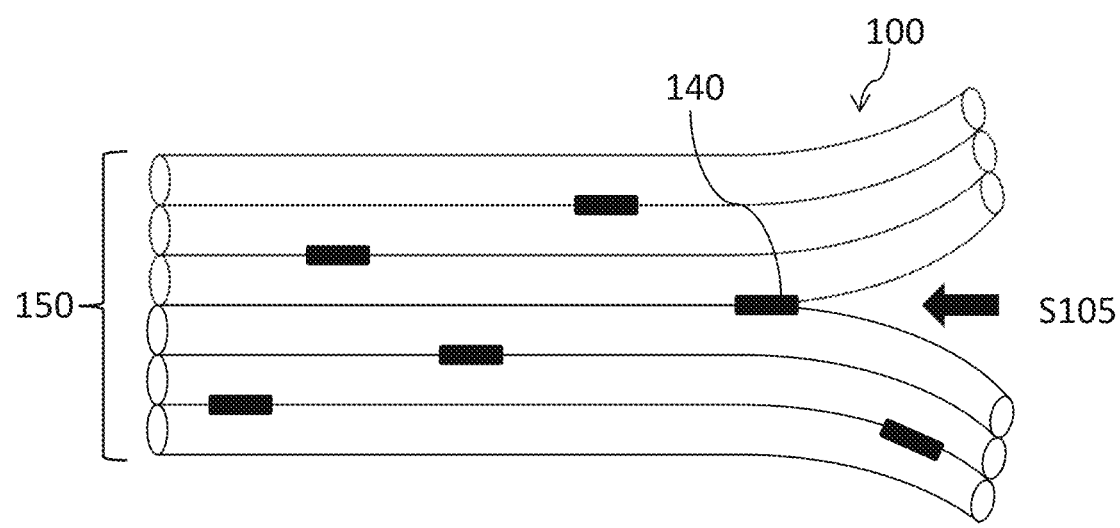
FIGS. 1D and 1E illustrate a process for separating neighboring optical fibers of a flexible ribbon according to embodiments of the present invention.
Figure 1E:
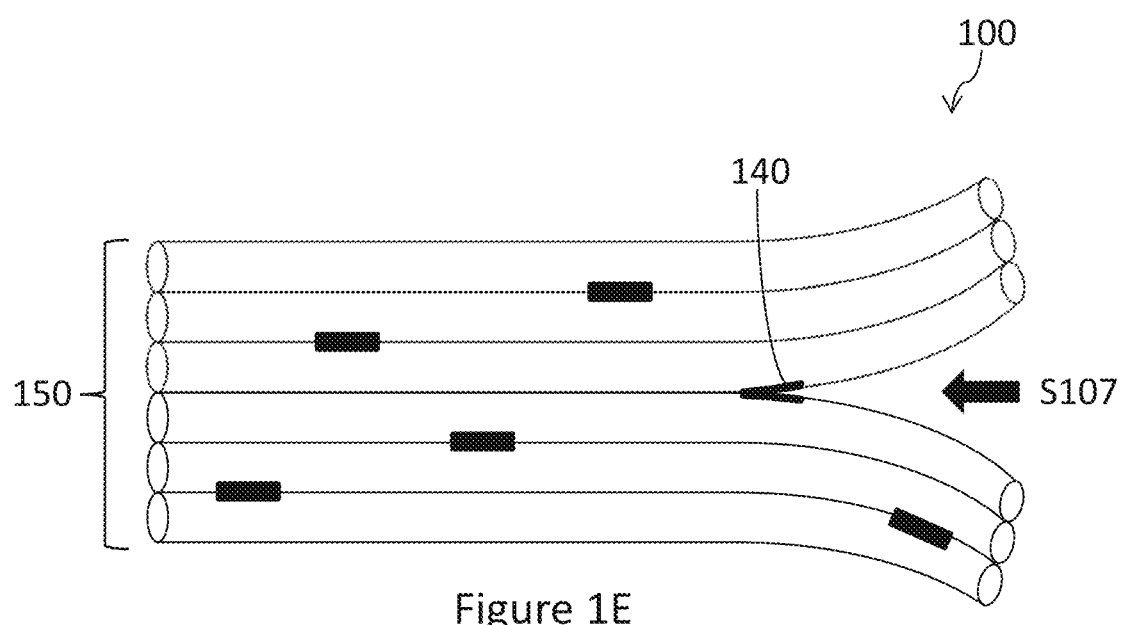

FIGS. 1D and 1E illustrate a process for separating neighboring optical fibers of a flexible ribbon according to embodiments of the present invention.

FIG. 1D illustrates a flexible ribbon 100 after it has been extracted and separated from an optical cable. For example, the flexible ribbon 100 may be extracted from an optical cable by separating its buffer tube no from other buffer tubes no and then cutting through the buffer tube jacket 160 of the buffer tube 110. Alternatively, the process for extracting and separating flexible ribbons from an optical cable may be performed by any method or process known to a person of ordinary skill in the art.

FIG. 1D illustrates a first separation step S105 for separating optical fibers 150 (such as optical fibers 151-156) from each other. The separation step S105 may start at any region of the flexible ribbon 100 where the surface between adjacent optical fibers 150 is free of bonding material 140. During step S105, the optical fibers 150 may be separated and spread out. In an embodiment, a service technician may begin the process of spreading the optical fibers 150 manually when placing the flexible ribbon 100 in a configuration such as that shown in FIG. 1D. As will be further described herein, a separation tool also may be used to separate the optical fibers 150. In particular, the separation tool may facilitate the movement of the optical fibers 150 around a blade of the separation tool so that individual ones of the optical fibers 150 are not cut or damaged by the blade of the separation tool.

FIG. 1E illustrates a second separation step S107 in which the bonding material 140 is cut through causing adjacent ones of the optical fibers 150 to separate without damaging the optical fibers 150. As will be further described herein, a separation tool enables cutting through the bonding material 140 attaching adjacent ones of the optical fibers 150 without cutting or damaging the optical fibers 150.

Figure 2A:
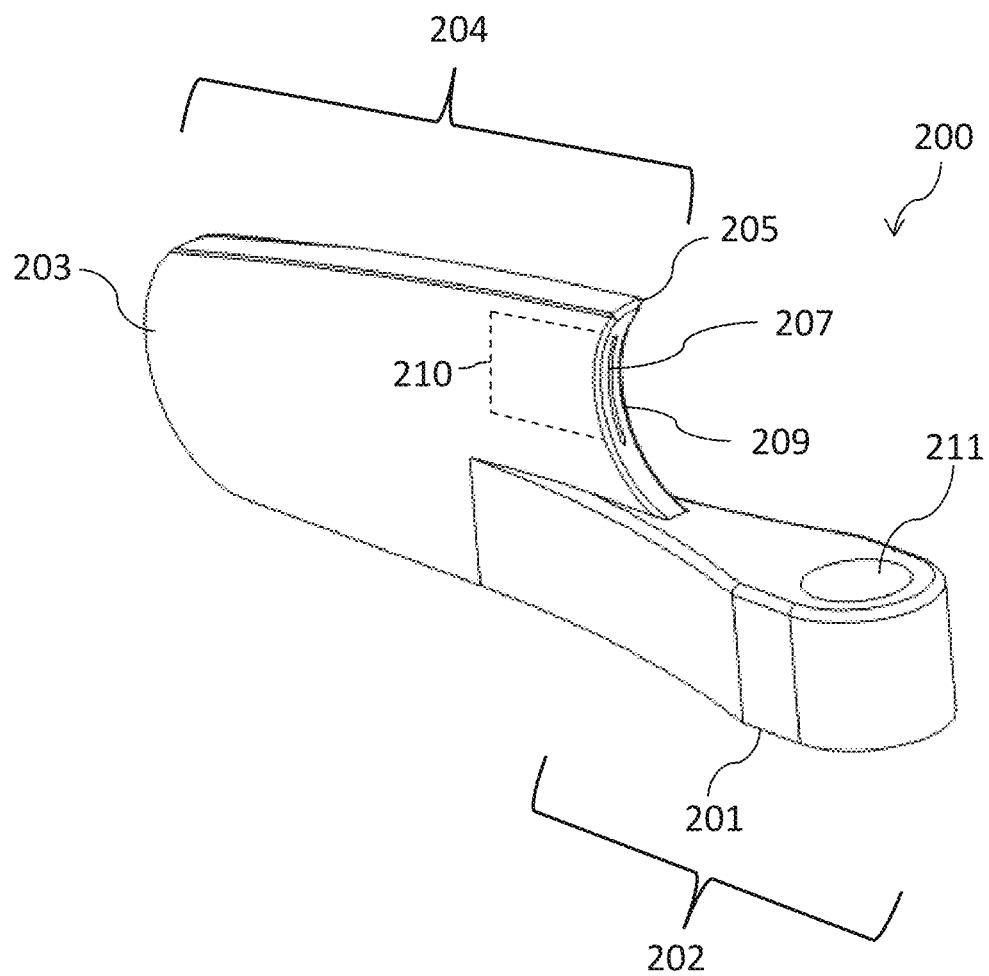
FIGS. 2A and 2B illustrate perspective views of a fiber separation tool according to embodiments of the present invention.
Figure 2B:
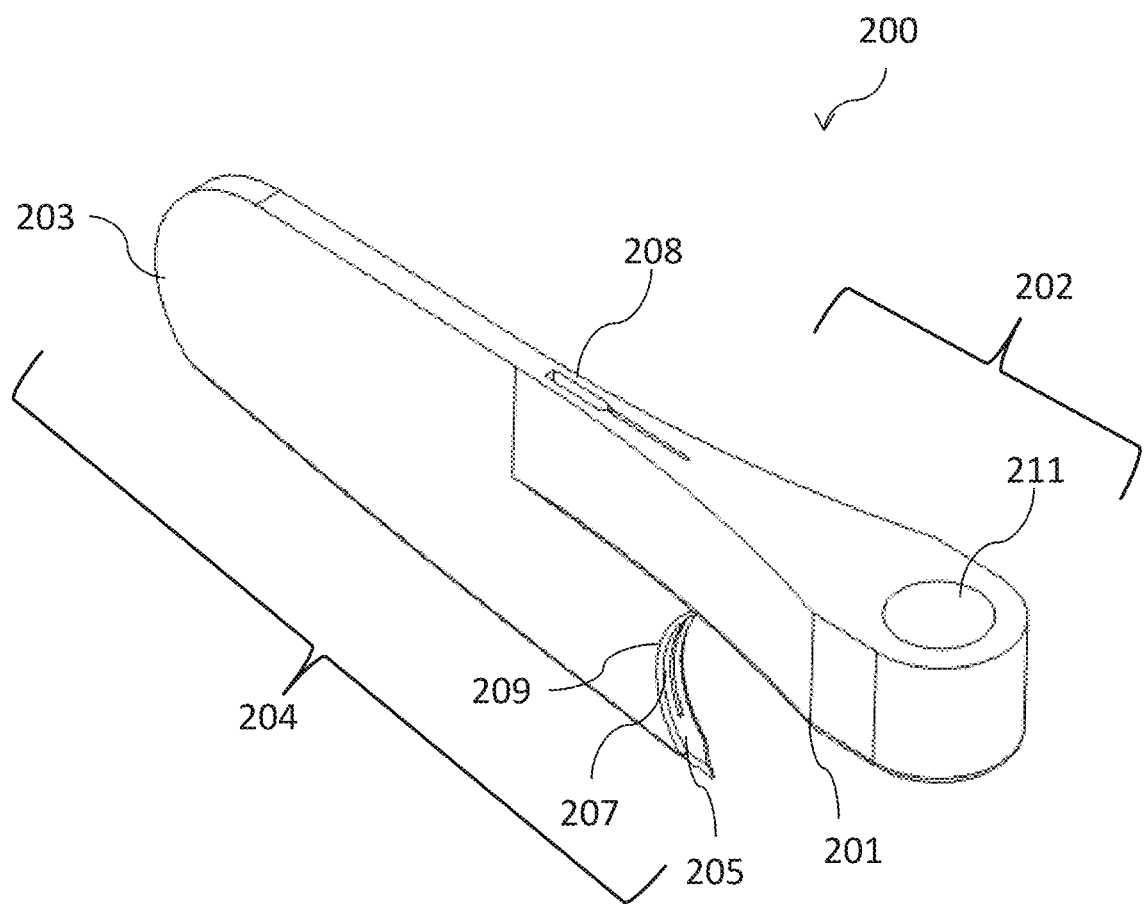

FIGS. 2A and 2B illustrate perspective views of a fiber separation tool 200 in accordance with embodiments of the present invention, wherein FIG. 2A is a bottom projection view and FIG. 2B is a top projection view.

Referring to FIG. 2A, the fiber separation tool 200 includes a handle portion 202 connected to a head portion 204. In an embodiment, the widest width of the head portion 204 may be narrower than the widest width of the handle portion. In an embodiment, the head portion 204 may have a greater vertical length than the vertical length of the handle portion 202. The fiber separation tool 200 may be formed as a unitary piece or it may include two or more separately formed pieces that are joined together to form the fiber separation tool 200.

In an embodiment, the fiber separation tool 200 may be formed as an integral monolithic component, for example, using 3-D printing. In an embodiment, the fiber separation tool 200 may include a left portion and a right portion, in which the left portion and the right portion are mirror images of each other, and the left portion and the right portion are joined together to form the fiber separation tool 200. In an embodiment, the left and right portions may include complementary extensions and openings, such that the left and right portions mate when pressed or snapped together. In another embodiment, the left and right portions may be adhered together using a suitable adhesive.

In particular embodiments, the fiber separation tool 200 is sized to fit in a service technician's tool belt or tool kit. It may be formed of one or more materials that are lightweight and do not add significant weight to the service technician's tools. In particular embodiments, the fiber separation tool 200 is a handheld tool.

The handle portion 202 of the fiber separation tool 200 includes a pivot point 201. The handle portion 202 may be formed from plastic, resin, nylon, polypropylene, polylactic acid, carbon, or any other suitably rigid material. In particular embodiments, the rigid material is a lightweight material. The handle portion 202 may be elongated in a longitudinal direction from the head portion 204. An end of the handle portion 202 may be rounded. The circumferential size of the handle portion 202 may be any size allowing for a comfortable grip by a user, for example, a service technician. The handle portion 202 may be smooth or it may be textured to allow for a more secure grip by the user. The handle portion 202 may also include indentions to assist in providing a comfortable and secure grip by the user.

In some embodiments, the handle portion 202 includes a bearing hole 211 that may receive a removable handle 217 (see FIG. 3). The bearing hole 211 may be a through hole extending completely through the handle portion 202. The bearing hole 211 may be any suitable size and shape to receive and stably hold the removable handle 217 during use of the fiber separation tool 200. The bearing hole 211 and the handle 217 may have the same shape or different shapes. The handle 217 may be formed from steel, alloy steel, carbon fiber, stainless steel 304, 316 L, duplex stainless steel 2205, hardened carbon steel, or any other suitable material.

In an embodiment, a user may grip or hold the handle portion 202 while using the fiber separation tool 200. In another embodiment, the user may grip or hold the handle 217 while using the fiber separation tool 200.

As illustrated in FIGS. 2A and 2B, the head portion 204 includes a fin 203, a hook tip 205, a blade holder 207, an opening 208, a lip 209, and a cavity 210. The head portion 204 may be formed from plastic, resin, nylon, polypropylene, polylactic acid, carbon, or any other suitably rigid material. In particular embodiments, the rigid material is a lightweight material.

The fin 203 may include a thin, elongated portion extending longitudinally from the handle portion 202. A first end of the fin 203 opposite the handle portion 202 may be a convex shape. In an embodiment, the first end of the fin 203 may be rounded, or it may be any other shape suitable for moving between optical fibers 150 without causing damage to the optical fibers 150. A second end of the fin 203, opposite the first end, includes a concave portion. A first end of the concave portion contacts the handle portion 202. A second, opposite, end of the concave portion forms the hook tip 205.

The hook tip 205 may be a rounded region, but is more preferably a pointed region or other shaped region suitable to assist in placement of the hook tip 205 between neighboring optical fibers 150. The hook tip 205 is placed between two neighboring optical fibers 150 where bonding material 140 is not present (see, e.g., description of step S105 of FIG. 1D).

The lip 209 is formed on both sides of the concave portion between the first end and the second end. A portion of the blade holder 207 is visible within the lip 209, such that the lip 209 is formed at each side of the visible portion of the blade holder 207. In an embodiment, the blade holder 207 may be centered in the concave portion such that equal amounts of the lip 209 are provided to the left and right of the opening for the blade holder 207.

The blade holder 207 is configured to hold a blade 213 (see FIGS. 3 and 4) in a fixed position where a predetermined portion of the blade 213 protrudes from the blade holder 207. The other portion of the blade 213 is housed in a cavity 210 in the fin 203. The cavity 210 is disposed within the fin 203. The cavity 210 has a shape and size to accommodate and provide support for the blade 213.

As illustrated in FIG. 3, the blade 213 may be inserted into blade holder 207 such that a sharp edge of the blade 213 protrudes from the blade holder 207. The blade 213 may be replaceable or it may be permanently affixed in the fin 203 in various embodiments. The blade 213 may be any suitable material for slicing through the bonding material 140. In one embodiment, the blade 213 is made of stainless steel. In other embodiments, the blade 213 may comprise steel, or alloys of steel comprising carbon, chromium, cobalt, manganese, nickel, molybdenum, tungsten, and/or vanadium. In other embodiments, the blade 213 may comprise other metal alloys, or carbon based materials, e.g., comprising graphite. The blade 213 may be any suitable shape for being securely held in the blade holder 207 during use of the fiber separation tool 200.

In an embodiment, the blade 213 is placed in the cavity 210 through an opening 208 formed in the head portion 204. The opening 208 may be formed along an upper edge of the head portion 204 over the cavity 210. The opening 208 may have a shape and size similar to the shape and size of the blade 213. In an embodiment, the blade 213 may be inserted into the opening 208, so that it drops smoothly into the cavity 210 and a portion of the blade 213 is exposed through the opening of the blade holder 207. The blade 213 may be removed by, for example, turning the fiber separation tool 200 over to allow the blade 213 to drop back through the opening 208.

In some embodiments, the fiber separation tool 200 may include a mechanism (not shown) for safe handling of the blade 213. For example, a mechanism may be provided to allow a user to slide the blade 213 in a longitudinal direction towards the first end of the fin 203, so that no portion of the blade 213 protrudes from the blade holder 207 when the fiber separation tool 200 is not in use. That is, the blade 213 may be safely and fully encased within the cavity 210 in fin 203. The mechanism would also allow the user to slide the blade 213 in the longitudinal direction towards the second end of the fin 203, so that a portion of the blade 213 protrudes from the blade holder 207 when the fiber separation tool is ready for use.

In some embodiments, the fiber separation tool 200 may include a blade cover or guard (not shown) to cover the exposed portion of the blade 213 when the blade 213 is present in the blade holder 207, but the fiber separation tool 200 is not in use.

The lip 209 has a thickness sufficient to prevent the optical fibers 150 from contacting the blade 213 placed in the blade holder 207. Accordingly, the lip 209 reduces the probability of the blade 213 contacting the optical fibers 150 by separating them to each side of the fin 203 as the blade 213 is moved toward the bonding material 140.

The fin 203 of the fiber separation tool 200 maintains a parallel orientation with respect to the optical fibers 150 when in use. This helps to reduce the probability that one or more of the optical fibers 150 contacts the blade 213 during use of the fiber separation tool 200. In some embodiments, the pivot point 201 may allow for the fin 203 to freely control the direction of the blade 213 and for the fiber separation tool 200 to maintain alignment with the optical fibers 150 of the flexible ribbon wo being separated.

FIG. 4 illustrates a fiber separation tool 200 separating neighboring optical fibers of a flexible ribbon in accordance with embodiments of the present invention.

A flexible ribbon wo is arranged where the plurality of optical fibers 150 are parallel to one another, for example, as shown in FIG. 1A. Two adjacent optical fibers from the optical fibers 150 are illustrated as being separated.

The hook tip 205 is inserted between the selected optical fibers 150 at a surface between adjacent optical fibers 150, e.g., in a region free of any bonding material 140. Thus, the hook tip 205 ensures a correct setup and alignment of the adjacent optical fibers 150 before the blade based cutting is performed. The fiber separation tool 200 is then pulled along the length of the optical fibers 150 until a segment of the bonding material 140 is reached. The blade 213 makes contact with the bonding material 140 and cuts smoothly through the bonding material 140 to separate the adjacent optical fibers 150. The adjacent optical fibers 150 are separated to each side of the head portion 204 as the fiber separation tool 200 continues its movement toward a next region of the bonding material 140, if any.

In an embodiment, the fiber separation tool 200 assists in proper optical fiber separation to reduce the probability of the blade 213 damaging the optical fibers 150. The pivot point 201 may allow the fin 203 to freely control the direction of the blade 213 and to maintain alignment with the optical fibers 150 being separated. The fin 203 ensures that the blade 213 remains parallel along the path of the flexible ribbon 100. As the fiber separation tool 200 encounters the bonding material 140, the blade 213 slices through the bonding material 140 by, e.g., creating a high stress zone that initiates a cohesive failure within the bonding material (i.e. the bonding material breaks without causing damage to the coating or ink layers of the optical fibers). The lip 209 surrounding the blade 213 guides the optical fibers 150 away from the blade 213 as it travels along the flexible ribbon 100.

In accordance with an embodiment of the present invention, a method for separating optical fibers from an intermittently bonded optical fiber ribbon includes creating a high stress zone within a bonding region to initiate cohesive failure of the bonding region without causing damage to the coating of the optical fibers.

In accordance with another embodiment of the present invention, a fiber separation tool composed of a rigid material is provided. The fiber separation tool includes a blade holder. The blade holder houses a blade and exposes a cutting edge of the blade.

In accordance with another embodiment of the present invention, a method of using a fiber separation tool includes inserting a hook tip between selected fibers, guiding the fiber separation tool in a direction parallel to the length of the fibers, controlling the fiber separation tool using a pivot point, introducing a blade to a bonding material to initiate a cohesive failure within the bonding material, and maintaining a distance between the blade and the fibers.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of using a fiber separation tool, the method comprising:
    arranging an array of fibers side-by-side, wherein each fiber is connected to at least one other neighboring fiber with a bonding material, and wherein the bonding material is intermittently dispersed between each fiber;
    selecting two neighboring fibers from the array of fibers;
    inserting a hook point of the fiber separation tool in between the selected fibers at a region free of the bonding material such that each selected fiber is alongside an opposing major surface of a fin comprising the hook point;
    guiding the fiber separation tool in a direction parallel to a length of the selected fibers such that the selected fibers pass alongside the opposing major surfaces of the fin;
    contacting the bonding material connecting the selected fibers with a blade of the fiber separation tool; and
    directing the fibers to each side of the fiber separation tool.

2. The method of claim 1, wherein each of the array of fibers comprises a fiber coating, and wherein a bonding property of the bonding material exceeds a cohesive strength of the fiber coating.

3. The method of claim 1, further comprising separating a flexible ribbon from a buffer tube of an optical cable prior to arranging the array of fibers side-by-side.

4. The method of claim 1, further comprising maintaining a minimum distance between the blade and the selected fibers, wherein the minimum distance is based on a thickness of a lip of the fiber separation tool.

5. The method of claim 1, wherein contacting the bonding material initiates a cohesive failure in the bonding material.

6. The method of claim 1, wherein each of the array of fibers is an individual optical fiber.

7. A method of using a fiber separation tool, the method comprising:
    arranging an array of fibers side-by-side, wherein each fiber is connected to at least one other neighboring fiber with a bonding material, and wherein the bonding material is intermittently dispersed between each fiber;
    selecting two neighboring fibers from the array of fibers;
    positioning a fiber separation tool in between the selected fibers, the fiber separation tool comprising a head portion that comprises a fin, a hook tip at a first end of the fin, a blade disposed in a cavity within the fin above the hook tip, a lip at each side of the blade opening, and a handle portion comprising a free end, the positioning comprising positioning the hook tip in between the selected fibers at a region free of the bonding material so that the blade faces the bonding material connecting the selected fibers and such that each selected fiber is alongside an opposing major surface of the fin; and
    separating the selected fibers by moving the fin in a direction parallel to a length of the selected fibers such that the selected fibers pass alongside the opposing major surfaces of the fin, wherein, during the moving,
    the lip prevents the selected fibers from contacting the blade,
    the blade cuts through the bonding material connecting the selected fibers,
    the fin maintains the fiber separation tool to be in a parallel orientation with respect to a plurality of fibers, and
    the free end is used to guide the fiber separation tool between the selected fibers.

8. The method of claim 7, wherein the fiber separation tool comprises a rigid material.

9. The method of claim 7, wherein the blade opening is centered in the lip, and wherein the blade is partially enclosed in the cavity within the fin.

10. The method of claim 7, wherein the blade is in a fixed position in the fiber separation tool.

11. The method of claim 7, further comprising removing the blade from the cavity through an opening formed in the head portion 204.

12. The method of claim 7, wherein the widest width of the head portion measured along a first direction substantially perpendicular to a major surface of the fin is narrower than the widest width of the handle portion measured along the same first direction, and wherein the greatest height of the head portion measured along a second direction perpendicular to both the first direction and the arranged fibers is greater than the greatest vertical height of the handle portion measured along the same second direction.

13. The method of claim 7, wherein the handle portion comprises plastic, resin, nylon, polypropylene, polylactic acid, or carbon.

14. The method of claim 7, wherein the array of fibers comprises a flexible ribbon.

15. The method of claim 7, further comprising:
inserting a removable handle into a bearing hole of the fiber separation tool, the bearing hole located in the handle portion, wherein the longest dimension of the inserted removable handle is perpendicular to the longest dimension of the fiber separation tool.

16. The method of claim 15, wherein the removable handle comprises steel, alloy steel, carbon fiber, stainless steel 304, 316 L, duplex stainless steel 2205, or hardened carbon steel.

17. The method of claim 15, wherein moving the fin comprises moving the removable handle.

18. The method of claim 7, wherein each of the array of fibers is an individual optical fiber.

19. A method of using an optical fiber separation tool, the method comprising:
inserting a blade through a first opening and into a cavity of an optical fiber separation tool such that the blade is exposed at a second opening, the optical fiber separation tool comprising a handle portion and a head portion that comprises a fin, a hook tip at a first end of the fin, and a lip at each side of the second opening, the fin defining the cavity within the fin, the first opening above the cavity, and the second opening above the hook tip;
arranging an array of optical fibers side-by-side, each optical fiber being connected to at least one other neighboring optical fiber with a bonding material;
selecting two neighboring optical fibers from the array of optical fibers;
positioning the optical fiber separation tool in between the selected optical fibers by positioning the hook tip between the selected optical fibers at a region free of the bonding material so that the blade faces the bonding material connecting the selected optical fibers and each selected optical fiber is alongside an opposing major surface of the fin; and
separating the selected optical fibers by moving the fin in a direction parallel to a length of the selected optical fibers such that the selected fibers pass alongside the opposing major surfaces of the fin to cut through the bonding material connecting the selected optical fibers with the blade.

20. The method of claim 19, further comprising:
inserting a removable handle into the handle portion of the optical fiber separation tool, wherein the longest dimension of the inserted removable handle is perpendicular to the longest dimension of the optical fiber separation tool.

* * * * *